(12) United States Patent
Cikanek et al.

(10) Patent No.: US 9,321,327 B2
(45) Date of Patent: Apr. 26, 2016

(54) AUTOMOTIVE VEHICLE AND METHOD FOR CONTROLLING POWER CONSUMPTION OF A COMPRESSOR THEREIN

(75) Inventors: Susan Rebecca Cikanek, Northville, MI (US); William David Treharne, Ypsilanti, MI (US); Paul Stephen Bryan, Belleville, MI (US); David Jason Mack, Plymouth, MI (US); Melinda A. Mack, legal representative, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1307 days.

(21) Appl. No.: 12/685,164

(22) Filed: Jan. 11, 2010
(Under 37 CFR 1.47)

(65) Prior Publication Data
US 2011/0164993 A1 Jul. 7, 2011

(51) Int. Cl.
*B60H 1/00* (2006.01)
*B60H 1/32* (2006.01)

(52) U.S. Cl.
CPC .......... *B60H 1/3208* (2013.01); *B60H 1/00392* (2013.01); *B60H 2001/3273* (2013.01)

(58) Field of Classification Search
CPC ........... F04B 17/06; G06F 7/00; B60H 1/004; B60H 1/00385; B60H 1/00735; B60H 1/00271; B60H 1/3208; B60H 1/3216; B60H 1/3222; B60H 2001/3273; B60H 2001/3292
USPC .......... 62/134, 228.1–230, 236, 244, 62/323.1–323.4; 165/41, 43; 303/152; 180/65.27; 307/66
See application file for complete search history.

(56) References Cited

U.S. PATENT DOCUMENTS

| | | | |
|---|---|---|---|
| 6,823,681 B2 | 11/2004 | Hirose et al. | |
| 6,840,055 B2 * | 1/2005 | Iritani | 62/230 |
| 6,883,340 B2 | 4/2005 | Hirose et al. | |
| 7,007,491 B2 * | 3/2006 | Grimm et al. | 62/230 |
| 2007/0131408 A1 | 6/2007 | Zeigler et al. | |
| 2007/0144194 A1 | 6/2007 | Lee | |
| 2007/0186573 A1 | 8/2007 | Ziehr et al. | |
| 2007/0193291 A1 | 8/2007 | Reddin et al. | |
| 2007/0204639 A1 | 9/2007 | Harrison | |

FOREIGN PATENT DOCUMENTS

| | | |
|---|---|---|
| CN | 201177349 Y | 1/2009 |
| WO | 0029231 A1 | 5/2000 |

OTHER PUBLICATIONS

"Foundations of Computer Science: C Edition", Alfred Aho and Jeffrey Ullman, Oct. 15 1994, W.H. Freeman (Publisher), ISBN: 0716782847, Chapter 3.*

* cited by examiner

*Primary Examiner* — Travis Ruby
(74) *Attorney, Agent, or Firm* — David B. Kelley; Brooks Kushman P.C.

(57) ABSTRACT

A method for controlling power consumption of a compressor of an automotive vehicle climate system may include identifying an energy source providing energy to power the compressor and selecting an operating parameter of the climate system based on the identified energy source to control power consumption of the compressor.

2 Claims, 2 Drawing Sheets

AUTOMOTIVE VEHICLE AND METHOD FOR CONTROLLING POWER CONSUMPTION OF A COMPRESSOR THEREIN

BACKGROUND

An automotive climate control system may include a compressor that pressurizes and moves refrigerant through an evaporator. Such compressors operate to accommodate vehicle cabin cooling demands. Some compressors operate either at a full-on or full-off mode. That is, the speed of the compressor cannot be varied. Other compressors, such as electric air conditioning compressors, may operate at varied speeds.

SUMMARY

Power consumption of a vehicle climate control system's variable capacity compressor may be controlled by altering and/or selecting operating parameters for the climate system based on an energy source providing energy to power the compressor. The energy source may be an electrical power storage unit, a regenerative braking system, and/or an engine. The operating parameters may include a target evaporator temperature, maximum compressor speed, maximum compressor power, and/or controller response time.

While example embodiments in accordance with the invention are illustrated and disclosed, such disclosure should not be construed to limit the invention. It is anticipated that various modifications, alternative designs, and control methods including equivalents thereof may be made without departing from the scope of the invention.

DETAILED DESCRIPTION

Figure 1:
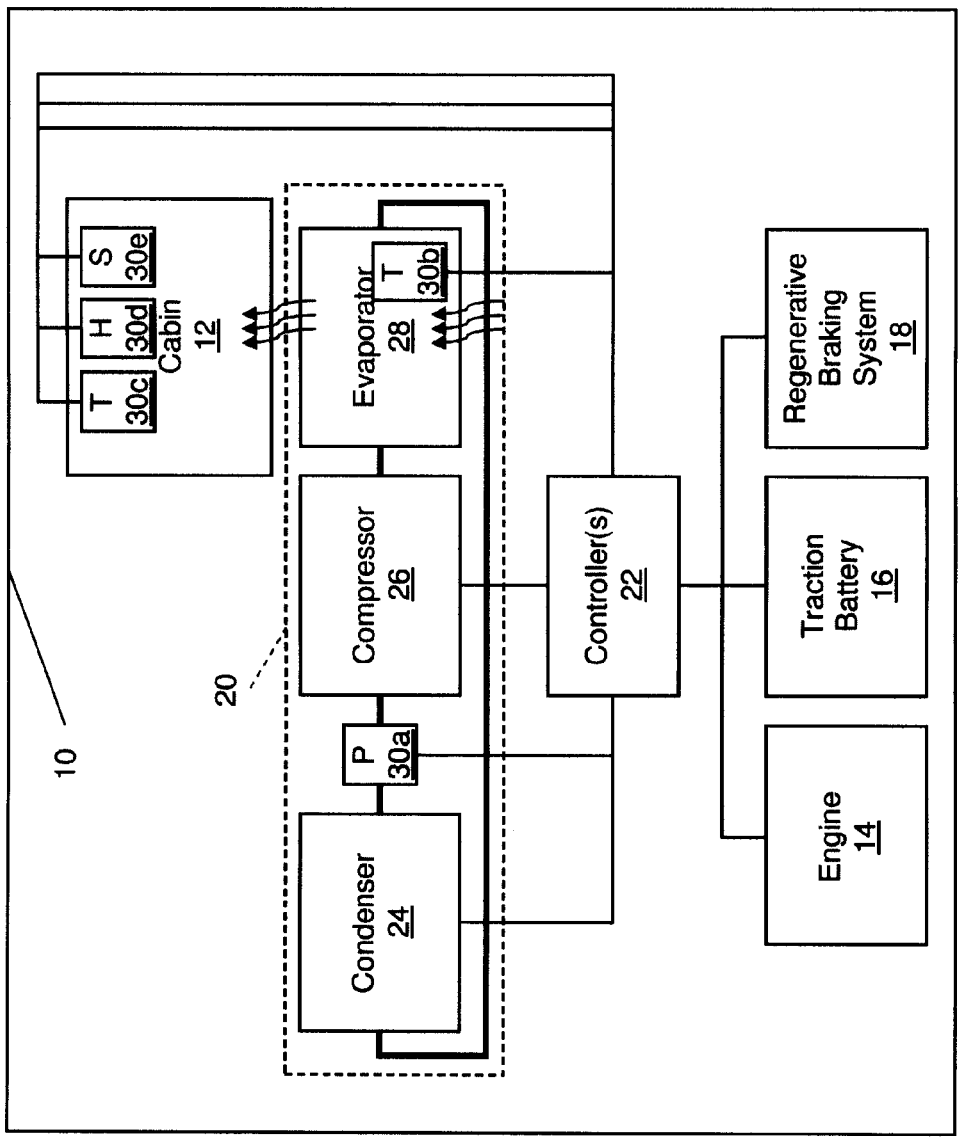
FIG. 1 is a block diagram of an embodiment of an automotive vehicle.

Referring now to FIG. 1, an automotive vehicle 10 may include a cabin 12, engine 14, power storage unit 16 (e.g., traction battery, ultra capacitor, etc.), regenerative braking system 18, climate system 20 and one or more controllers 22. The engine 14 and traction battery 16 may provide energy to move the vehicle 10. The regenerative braking system 18 may capture energy from vehicle braking (active or coasting) for storage by the traction battery 16 and/or use by electrical devices within the vehicle 10. In other embodiments, the vehicle 10 may be a plug-in battery electric vehicle, fuel cell vehicle, etc.

The climate control system 20 may include a condenser 24, variable capacity compressor 26 (e.g., variable speed, variable displacement, belt driven electrically variable displacement, etc.), and evaporator 28. Coolant may be circulated through the loop (shown in dark line) fluidly connecting the condenser 24, compressor 26 and evaporator 28. The coolant cools air (indicated by arrows) passing over the evaporator 28. This air may be used to cool the cabin 12.

The vehicle 10 further includes one or more sensors $30n$ (e.g., $30a$-$30e$). In the embodiment of FIG. 1, the sensor $30a$ senses the pressure in the loop between the condenser 24 and compressor 26. The sensor $30b$ senses the temperature of the evaporator 28. The sensors $30c$-$30e$ sense the temperature, humidity and sun load respectively in the cabin 12. Other and or different sensors may also be used. Information from the sensors $30n$ is communicated to the one or more controllers 22.

Cabin temperature is related to evaporator temperature:

$$\text{cabin temp.} = f(\text{evaporator temp.}). \quad (1)$$

Additionally, evaporator temperature is related to compressor speed:

$$\text{evaporator temp.} = f(\text{compressor speed}). \quad (2)$$

Hence, cabin temperature is related to compressor speed:

$$\text{cabin temp.} = f(\text{compressor speed}). \quad (3)$$

To achieve a desired cabin temperature (input by an occupant of the vehicle), a target evaporator temperature (and thus a corresponding compressor speed) may be selected by the one or more controllers 22. Such targets may be established through testing, simulation, etc. The one or more controllers 22 may use a proportional-integral (PI) control scheme (or any other suitable control scheme) that determines the compressor speed based on a difference between the actual and target evaporator temperatures. The one or more controllers 22 may also limit compressor speed and compressor power, as known in the art.

Table 1 illustrates potential sources of energy to power the compressor 26. The "cheapest" energy (the energy having the least impact on fuel economy) is listed at the top. The most "expensive" energy (the energy having the greatest negative impact on fuel economy) is listed at the bottom.

TABLE 1

| Source |
| --- |
| Regenerative Braking |
| Compression Braking |
| Engine, Low BSFC |
| Engine, High BSFC |
| Battery |

Energy generated during regenerative braking is less expensive compared with energy generated during compression braking. Energy generated during compression braking is less expensive than energy generated by the engine 14 illustrated in FIG. 1. Energy generated by the engine 14 running with low brake specific fuel consumption is less expensive than energy generated by the engine 14 running with high brake specific fuel consumption, etc. Hence, powering the compressor 26 with energy generated during regenerative braking will have the least impact on fuel economy. Powering the compressor 26 with energy taken from the traction battery 16 will have the greatest impact on fuel economy. (Assuming that energy stored in the traction battery 16 was generated, for example, by the engine 14 or through regenerative braking, and that losses occur while storing energy to and retrieving energy from the traction battery 16.)

Figure 2:
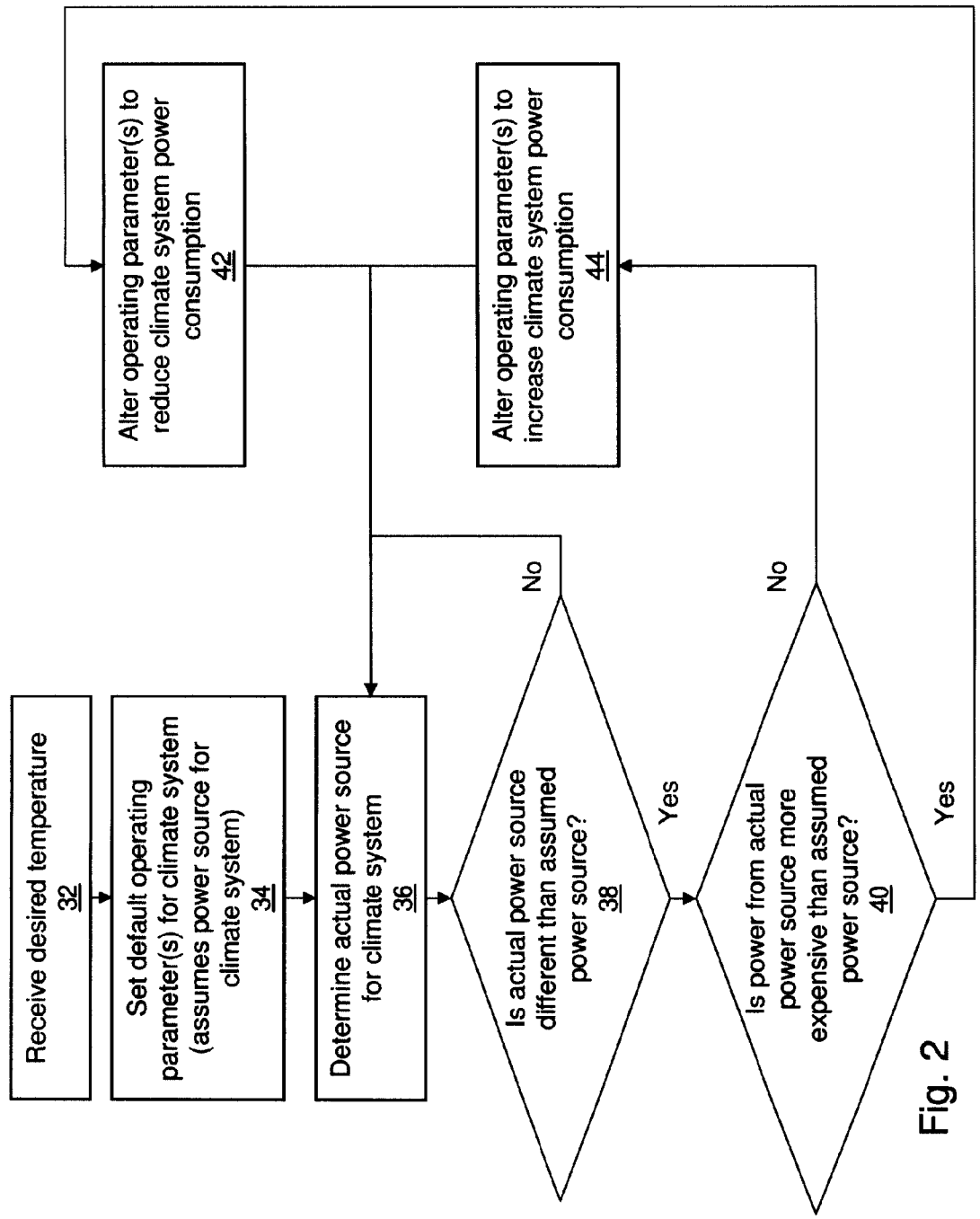
FIG. 2 is a flow chart depicting an example algorithm for controlling power consumption of the compressor of FIG. 1.

Referring now to FIGS. 1 and 2, the operation of the compressor 26 may be controlled so as to influence the impact on fuel economy. At operation 32, the one or more controllers 22 may receive a desired temperature input from an occupant of the vehicle 10. The occupant, for example, may select 75° F. via a signal input device on an instrument panel of the vehicle 10.

At operation 34, the one or more controllers 22 may set default operating parameters for the climate system 20. These parameters may include one or more of target evaporator temperature, maximum compressor speed, maximum compressor power, response time of the one or more controllers 22, etc. In some embodiments, the default operating parameter values may be set based on the desired temperature and the assumption that the source of power for the compressor 26 is compression braking. The target evaporator temperature, maximum compressor speed or displacement, etc. may be set aggressively (resulting in faster performance of the climate system 20) as energy to power the compressor 26 is assumed to be relatively cheap.

In other embodiments, the default operating parameter values may be set based on the desired temperature and the assumption that the source of power for the compressor 26 is relatively expensive (resulting in slower performance of the climate system 20). Generally speaking, lower target evaporator temperatures and shorter controller response times, as well as higher maximum compressor speeds and compressor power improve performance of climate systems. (Certain compressors, however, may be less efficient at high or low speeds.)

At operation 36, the one or more controllers 22 may determine, in a known fashion, the actual power source for the compressor 26. For example, the one or more controllers 22 may determine whether the energy to power the compressor is being generated by the engine 14, traction battery 16 or regenerative braking system 18.

At operation 38, the one or more controllers 22 may determine whether the actual power source is different than the assumed power source. That is, the one or more controllers 22 may determine if the assumption regarding the cost of energy to power the compressor 26 is accurate given current vehicle circumstances. For example, the one or more controllers 22 may determine, in a known fashion, whether energy generated from compression braking is the actual source of power for the compressor 26 (in the case where compression braking is the assumed source of power). If no, the algorithm may end.

If the actual power source is different than the assumed power source, the one or more controllers 22 may determine, at operation 40, whether energy from the actual power source is more expensive than energy from the assumed power source. For example, the one or more controllers 22 may determine, in a known fashion, that the engine 12 is generating energy to power the compressor 26 and that the engine 12 is running with high brake specific fuel consumption. As such, the relative cost of the energy to power the compressor 26 is more expensive than the assumed relative cost used to set the default operating parameter values (assuming that the default operating parameters were set with an assumption of relatively cheap energy, such as energy from compression braking, to power the compressor 26). If no, the algorithm may end.

If energy from the actual power source is more expensive than energy from the assumed power source, the one or more controllers 22 may, at operation 42, alter the operating parameter(s) of the climate system 20 to reduce the power consumption of the compressor 26 (at the expense of performance). Continuing with the example above, the one or more controllers 22 may raise the target evaporator temperature, increase its response time, decrease the limit on compressor speed and/or decrease the limit on compressor power. The amount by which the operating parameters are altered may be determined via testing, simulation, etc. and, in some embodiments, balance the desire to reduce power consumption with the performance expected/tolerated by vehicle occupants.

Returning to operation 40, the one or more controllers 22, if the energy from the actual power source is not more expensive (i.e., is less expensive) than energy from the assumed power source, may alter the operating parameter(s) of the climate system 20 to increase the power consumption of the compressor 26 (to improve performance). The one or more controllers 22, for example, may lower the target evaporator temperature, decrease its response time, increase the limit on compressor speed and/or increase the limit on compressor power. Again, the amount by which the operating parameters are altered may be determined via testing, simulation, etc. and balance power consumption with performance.

In other embodiments, the one or more controllers 22 may access a look-up table having values for the climate system operating parameters mapped with the potential sources of energy for the compressor 26. Before selecting the operating parameters for the climate system 20, the one or more controllers 22 may determine, in a known fashion, the energy source for the compressor 26 and retrieve one or more operating parameters associated with that source from the look-up table. In such embodiments, default operating parameters may not be necessary. The one or more controllers 22 may periodically determine the energy source for the compressor 26 and retrieve/alter the appropriate operating parameters, etc. Other scenarios are also possible.

As apparent to those of ordinary skill, the algorithms disclosed herein may be deliverable to a processing device in many forms including, but not limited to, (i) information permanently stored on non-writable storage media such as ROM devices and (ii) information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), state machines, controllers or other hardware components or devices, or a combination of hardware, software and firmware components.

While embodiments of the invention have been illustrated and described, it is not intended that these embodiments illustrate and describe all possible forms of the invention. Rather, the words used in the specification are words of description rather than limitation, and various changes may be made without departing from the spirit and scope of the invention.

What is claimed:

1. A vehicle comprising:
   a battery;
   an engine;
   a regenerative braking system;
   a climate system including a variable capacity compressor; and
   a controller configured to alter a response time of the controller based on which of the battery, engine, and braking system is providing energy to power the compressor such that power consumption of the compressor is greater in response to the braking system providing energy to power the compressor as compared with the engine.

2. A method of operating a vehicle climate system including a variable capacity compressor comprising:
   altering, by one or more controllers, a response time of the one or more controllers based on which of a power storage unit, engine, and braking system is providing energy to power the compressor such that power consumption of the compressor is greater in response to the braking system providing energy to power the compressor as compared with the engine.

* * * * *